United States Patent [19]
Thomasian

[11] 3,777,591
[45] Dec. 11, 1973

[54] ROTATION LIMITING DEVICE

[75] Inventor: Harvey A. Thomasian, Northboro, Mass.

[73] Assignee: Lowell Corporation, Worcester, Mass.

[22] Filed: Mar. 15, 1971

[21] Appl. No.: 124,272

[52] U.S. Cl.............. 74/576, 74/436, 74/820, 74/157, 192/139
[51] Int. Cl..... G05g 1/00, F16h 55/04, F16h 27/06
[58] Field of Search.............. 74/436, 820, 148, 74/157, 158, 575–578; 192/138, 139

[56] References Cited
UNITED STATES PATENTS

| | | | |
|---|---|---|---|
| 1,201,919 | 10/1916 | Bateman | 74/576 X |
| 2,137,643 | 11/1938 | Lirac et al. | 74/576 |
| 2,181,244 | 11/1939 | McGrew | 74/576 |
| 3,138,030 | 6/1964 | Godel | 74/575 X |
| 1,167,854 | 1/1916 | Stineman et al. | 74/436 |
| 1,795,420 | 3/1931 | Beall | 192/139 |
| 1,850,260 | 3/1932 | Daly | 192/139 |
| 2,605,647 | 8/1952 | Duvoisin | 74/436 |
| 2,870,646 | 1/1959 | Miyazawa | 192/139 X |
| 3,332,295 | 7/1967 | Cummings, Jr. et al. | 74/157 |
| 3,333,477 | 8/1967 | Denkowski | 192/139 X |

*Primary Examiner*—Arthur T. McKeon
*Attorney*—Norman S. Blodgett

[57] ABSTRACT

This invention relates to a rotation limiting device and, more particularly, to apparatus for stopping the rotation of a shaft at each end of a predetermined angular rotation.

4 Claims, 5 Drawing Figures

PATENTED DEC 11 1973

HARVEY A. THOMASIAN
INVENTOR.

BY
Norman S. Blodgett 3,777,591

ROTATION LIMITING DEVICE

BACKGROUND OF THE INVENTION

There are many occasions in the design of machinery where it is necessary to terminate rotation at a selected point. For instance, in the case of a motor-driven valve, it is desirable to stop further motor pressure when the valve reaches its closed position, otherwise, the sealing surfaces of the valve could be damaged. In the past, apparatus for performing this torque-limiting function has been complicated and expensive; furthermore, they have been subject to erratic operation and to breakdown. These and other difficulties experienced with the prior art devices have been obviated in a novel manner by the present invention.

It is, therefore, an outstanding object of the invention to provide a rotation limiting device which is simple and rugged in construction and which is capable of a long life of useful service.

Another object of this invention is the provision of a rotation limiting device to prevent the application of damaging torque to machinery at the end of a predetermined angular rotation.

A further object of the present invention is the provision of a rotation limiting device that lends itself to design for a selected angle of permissible rotation within a wide range of angles.

With these and other objects in view, as will be apparent to those skilled in the art, the invention resides in the combination of parts set forth in the specification and covered by the claims appended hereto.

SUMMARY OF THE INVENTION

In general, the invention consists of a rotation limiting device having a housing, having a shaft rotatably mounted in the housing, having a ratchet wheel mounted on the shaft for rotation therewith, and having first and second pawls mounted in the housing and movable toward and away from the ratchet. A biasing means is provided continually pressing the pawls toward the ratchet wheel and restraining means is provided for normally maintaining the pawls out of engagement with the ratchet wheel. A release means is operative at either end of a predetermined angular rotation of the shaft to permit one of the pawls to move into engagement with and prevent further rotation of the ratchet wheel.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
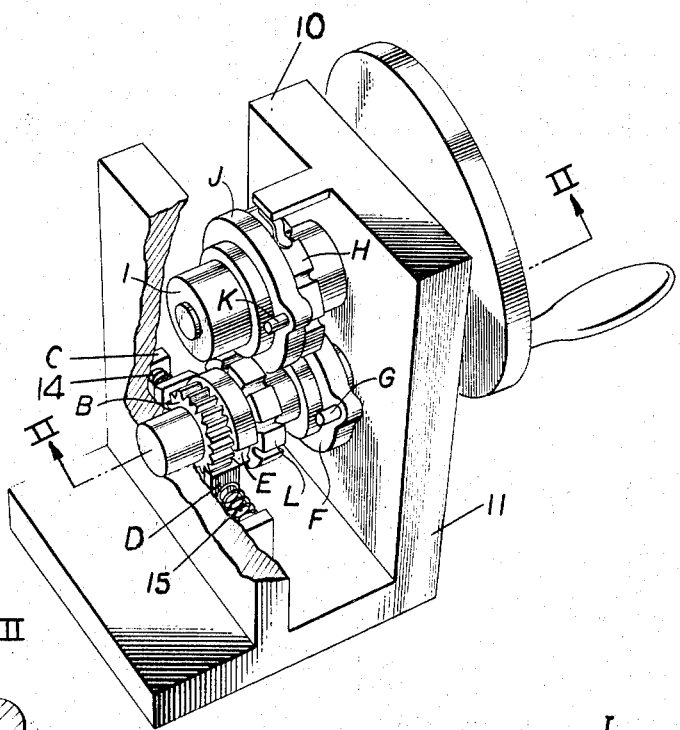
FIG. 1 is a perspective view with portions broken away of a rotation limiting device embodying the principles of the present invention.

Referring first to FIG. 1, wherein are best shown the general features of the invention, the rotation limiting device, indicated generally by the reference numeral 10, is shown as having a housing 11 in which is rotatably mounted a shaft A. One end 12 of the shaft lies within the housing, while the other end 13 extends from the housing for attachment to a drive 14. This drive is shown symbolically as a crank, but in a practical embodiment, it might be a motor driving a valve, so that the shaft A is rotated at the same speed as one of the shafts in the drive for the valve.

A ratchet wheel B is pinned to the shaft A adjacent the end 12 for rotation therewith. A first pawl C is hingedly mounted in the housing so that one end is movable toward and away from the ratchet wheel. A second pawl D is mounted in the housing for hinged movement toward and away from the ratchet wheel. A biasing means such as coil springs 14 and 15 press the pawls C and D, respectively, continuously toward the ratchet wheel. The pawls are normally retained out of engagement with the teeth of the ratchet wheel by a restraining means, such as a cam E. A release means, such as the notch M, is operative at either end of a predetermined angular rotation of the shaft to permit one of the pawls C and D to move into engagement with and prevent further engagement of the ratchet wheel, the shaft, and of the drive into which it is connected.

Figure 2:
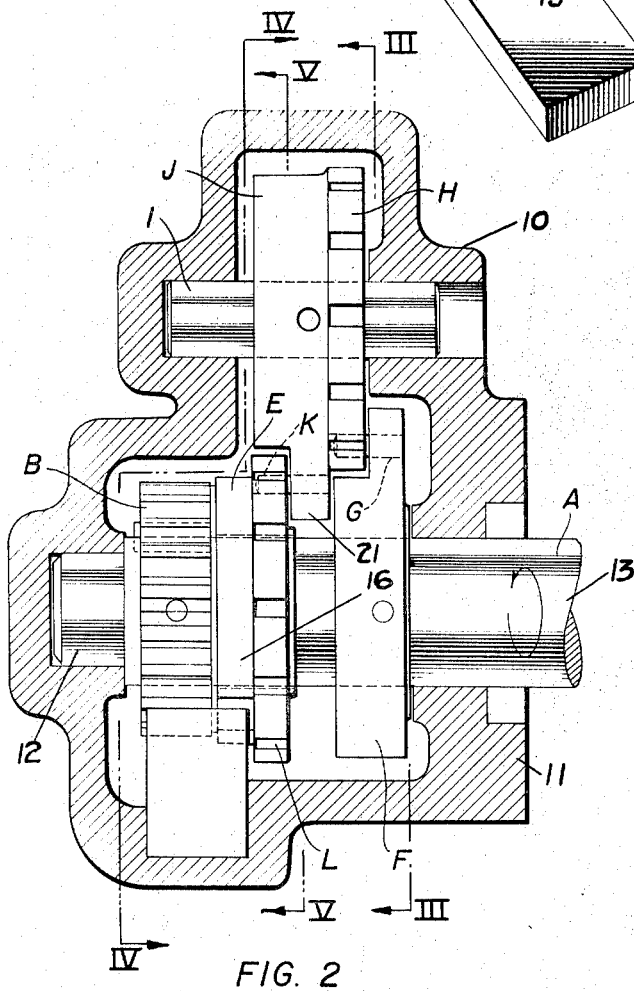
FIG. 2 is a vertical sectional view of the invention taken on the line II—II of FIG. 1.
Figures 4, 5:
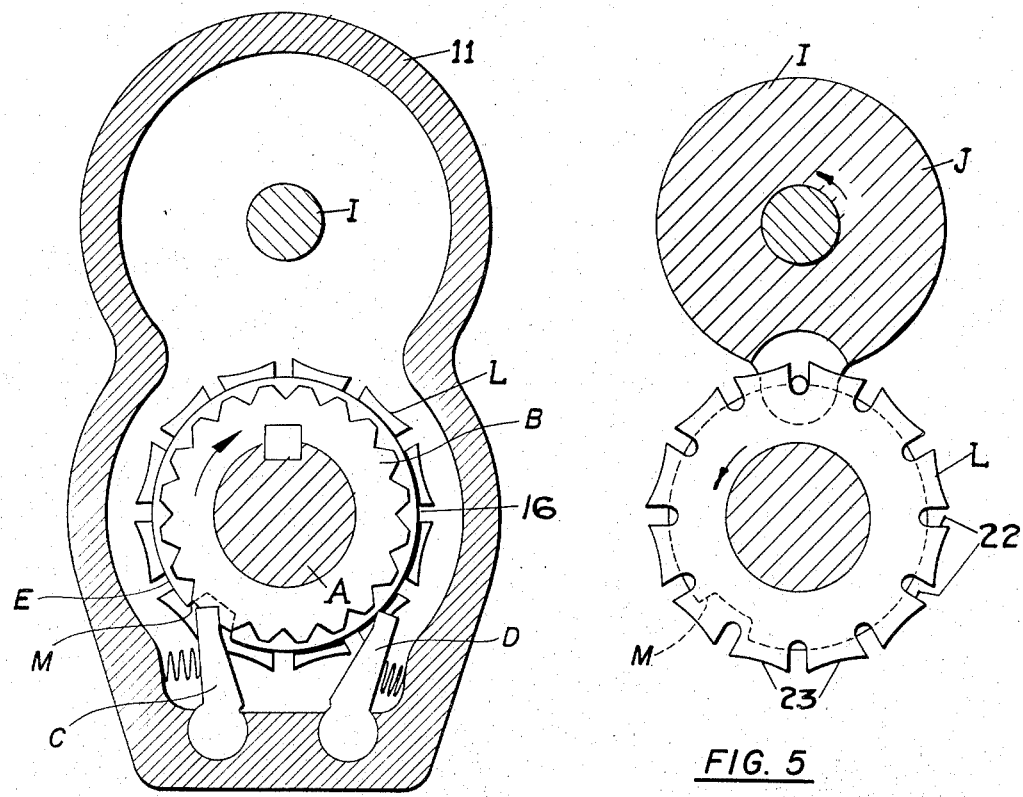
FIG. 4 is a sectional view of the invention taken on the line IV—IV of FIG. 2.
FIG. 5 is a sectional view of the invention taken on the line V—V of FIG. 2.

Referring to FIG. 2, the cam E is rotatably mounted on the shaft and has a peripheral surface 16 which, throughout most of its extent, lies radially outwardly of the periphery of the ratchet wheel. The pawls C and D normally rest against and are slidable over this surface. As is evident in FIG. 4, the peripheral surface of the cam E is provided with an indentation or notch M, the bottom of which lies radially inwardly of the periphery of the ratchet wheel, so that a pawl engages a tooth of the ratchet wheel when it lies in the indentation. The cam is drivingly connected to the shaft A through a speed-reduction means consisting of a collar F, a gear H, a collar J, and a gear L. The collar F is pinned to the shaft A and has a protuberance 17 from which extends in a direction parallel to the axis of the shaft a pin G.

Mounted in the housing 11 parallel to the shaft A is a secondary shaft I on which is pinned a geneva gear H having a periphery which is formed with alternate notches 18 and concave arcs 19. Also locked to the secondary shaft I is a collar J having a protuberance 21 (see FIG. 2) from which extends a pin K. Formed integrally with and rotatable with the cam E is a geneva gear L having notches 22 and concave arcs 23.

Figure 3:
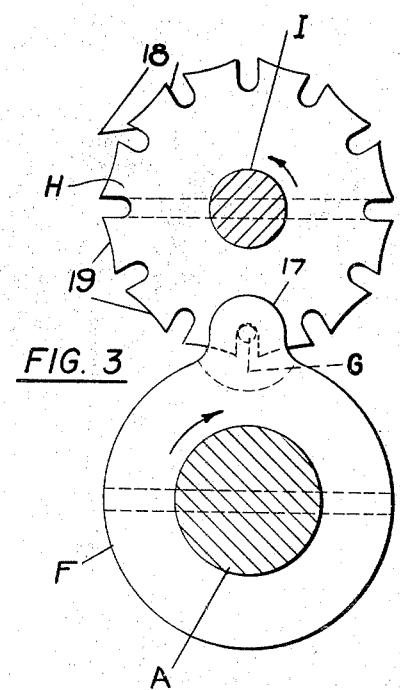
FIG. 3 is a transverse sectional view of the invention taken on the line III—III of FIG. 2.

The operation of the invention will now be readily understood in view of the above description. Let us suppose that the shaft A is driven in synchronization with and connected to the drive which opens and closes a valve. With the motor driving the valve stem in the closing direction, the shaft A rotates freely and does not inhibit the drive. The shaft A is rotated in the direction indicated by the arrow in FIGS. 2, 3, 4, and the collar F rotates with it. The pin G engages the notches 18 one at a time and moves the geneva gear H the distance between two adjacent notches for each revolution of the shaft A and collar F. In the illustration the speed reduction is 12:1. The secondary shaft I is rotated by the gear H and, in turn, rotates the collar J. The pin K of the collar drives the geneva gear L and, therefore, the cam E. The speed reduction as illustrated between the collar J and the gear L is 12:1. The total speed reduction, therefore, between the shaft A and the cam E is 144:1. As the cam is rotated, eventually, the notch M reaches the pawl D, so that it falls into it and into engagement with the nearest tooth of the ratchet wheel. This engagement of the pawl with the tooth of the ratchet wheel prevents further rotation of the shaft A and prevents further application of torque to the valve stem (or any other driven instrumentality to which the torque limiting device is connected). When the shaft is driven in the other direction, it is stopped when the pawl C falls into the notch M and engages a tooth of the ratchet wheel.

It can be seen that it is possible to select the geneva gears H and L in such a way that the angle of rotation of the shaft A from "lock to lock" will be a desired amount. The simple construction is not only inexpensive to manufacture, but it is so simple that there are no complexities to get out of order. It is possible to construct it rugged and avoid wear and breakage.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A rotation limiting device, comprising
   a. a housing,
   b. a shaft rotatably mounted in the housing,
   c. a ratchet wheel mounted on the shaft for rotation therewith,
   d. a first pawl mounted in the housing and movable toward and away from the ratchet wheel,
   e. a second pawl mounted in the housing and movable toward and away from the ratchet wheel,
   f. biasing means continually pressing the pawls toward the ratchet wheel,
   g. restraining means normally maintaining the pawls out of engagement with the ratchet wheel, and
   h. release means operative at either end of a predetermined angular rotation of the shaft to permit one of the pawls to move into engagement with and prevent further rotation of the ratchet wheel.

2. A rotation limiting device as recited in claim 1, wherein the biasing means consists of a coil spring extending between the housing and each pawl.

3. A rotation limiting device as recited in claim 1, wherein the restraining means is a cam rotatably mounted on the shaft and having a peripheral surface which, throughout most of its extent, lies radially outwardly of the periphery of the ratchet wheel, the pawls normally resting against and slidable over the said peripheral surface.

4. A rotation limiting device as recited in claim 3, wherein the release means includes an indentation on the peripheral surface of the cam, the bottom of the indentation lying radially inwardly of the periphery of the ratchet wheel, so that a pawl engages the ratchet wheel when it lies in the indentation.

* * * * *